United States Patent
Campbell et al.

(10) Patent No.: US 9,528,552 B2
(45) Date of Patent: Dec. 27, 2016

(54) ROLLER BEARING OUTER RACE FOR HYDRAULIC UNIT

(71) Applicant: Hamilton Sundstrand Corporation, Charlotte, NC (US)

(72) Inventors: Kris H. Campbell, Poplar Grove, IL (US); Glenn C. Lemmers, Jr., Loves Park, IL (US); Doren C. Smith, Rockford, IL (US); Edward C. Allen, Davis, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 25 days.

(21) Appl. No.: 14/598,309

(22) Filed: Jan. 16, 2015

(65) Prior Publication Data

US 2016/0208853 A1 Jul. 21, 2016

(51) Int. Cl.
*F16C 33/58* (2006.01)
*F04B 1/12* (2006.01)
*F04B 1/20* (2006.01)
*F03C 1/06* (2006.01)

(52) U.S. Cl.
CPC .......... *F16C 33/581* (2013.01); *F03C 1/0602* (2013.01); *F03C 1/0644* (2013.01); *F03C 1/0663* (2013.01); *F03C 1/0665* (2013.01); *F04B 1/122* (2013.01); *F04B 1/2014* (2013.01); *F04B 1/2064* (2013.01); *F04B 1/2071* (2013.01)

(58) Field of Classification Search
CPC ..... F16C 33/581; F16C 33/583; F16C 33/585; F16C 33/58
See application file for complete search history.

(56) References Cited

U.S. PATENT DOCUMENTS

| 772,075 A | * | 10/1904 | Wiedemann | F16C 33/581 384/537 |
| 3,965,974 A | * | 6/1976 | Sernetz | F16C 13/02 164/448 |
| 5,582,482 A | * | 12/1996 | Thom, Jr. | F16C 13/02 384/434 |

(Continued)

FOREIGN PATENT DOCUMENTS

DE 9415059 * 9/1994 ............ F16C 19/16

OTHER PUBLICATIONS

International Search Report, International Application No. 16151758.6-1608, Date of Mailing Aug. 1, 2016, European Patent Office; International Search Report 5 pages.

*Primary Examiner* — Thomas R. Hannon
(74) *Attorney, Agent, or Firm* — Cantor Colburn LLP

(57) ABSTRACT

A roller bearing outer race of a hydraulic unit having a body having a first part and a second part. The first part comprising a central section having an exterior curved portion, an exterior angled portion, and a circular inner portion, wherein a central aperture defining a first axis passes through the circular inner portion of the central section, a first arm extending from a first side of the central section, and a second arm extending from a second side of the central section. A race within the circular inner portion of the central section, the race defined by a first race wall and a second race wall and wherein a thickness of the first arm and the second arm is about 0.450 inches (1.143 cm) and a radial distance of an exterior surface of the exterior curved portion from the first axis is about 0.657 inches (1.669 cm).

11 Claims, 6 Drawing Sheets

(56) References Cited

U.S. PATENT DOCUMENTS

| | | | |
|---|---|---|---|
| 2007/0223854 A1* | 9/2007 | Waseda | F01L 1/047 384/584 |
| 2009/0078149 A1* | 3/2009 | Tabler | B65G 35/063 104/166 |
| 2013/0193790 A1 | 8/2013 | Rittmeyer | |
| 2014/0009125 A1 | 1/2014 | Vanderzyden et al. | |
| 2014/0219598 A1 | 8/2014 | Grosskopf et al. | |

* cited by examiner

ROLLER BEARING OUTER RACE FOR HYDRAULIC UNIT

BACKGROUND OF THE INVENTION

Exemplary embodiments of this invention generally relate to an integrated drive generator, and more particularly, to a roller bearing outer race of a hydraulic unit of an integrated drive generator.

Aircrafts currently rely on electrical, pneumatic, and hydraulic systems for secondary power. A typical electrical system utilizes an integrated drive generator coupled to each engine of the aircraft to provide a fixed frequency power to a power distribution system and associated loads. One type of integrated drive generator includes a generator, a hydraulic unit, and a differential assembly arranged in a common housing. The differential assembly is operably coupled to an aircraft engine, such as a gas turbine engine, via an input shaft. The rotational speed of the input shaft varies during the operation of the engine. The hydraulic unit cooperates with the differential assembly to provide a constant speed to the generator throughout engine operation.

Due to engineering designs and requirements various components of the systems must be designed to operatively function together. For example, various components of the hydraulic unit are configured to appropriately and accurately mate and fit together to enable efficient operation.

BRIEF DESCRIPTION OF THE INVENTION

According to one embodiment of the invention, a roller bearing outer race of a hydraulic unit is provided. The roller bearing outer race having a body having a first part and a second part. The first part comprising a central section having an exterior curved portion, an exterior angled portion, and a circular inner portion, wherein a central aperture defining a first axis passes through the circular inner portion of the central section, a first arm extending from a first side of the central section, and a second arm extending from a second side of the central section. A race within the circular inner portion of the central section, the race defined by a first race wall and a second race wall and wherein a thickness of the first arm and the second arm is about 0.450 inches (1.143 cm) and a radial distance of an exterior surface of the exterior curved portion from the first axis is about 0.657 inches (1.669 cm).

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example, with reference to the drawings.

DETAILED DESCRIPTION OF THE INVENTION

Figure 1:
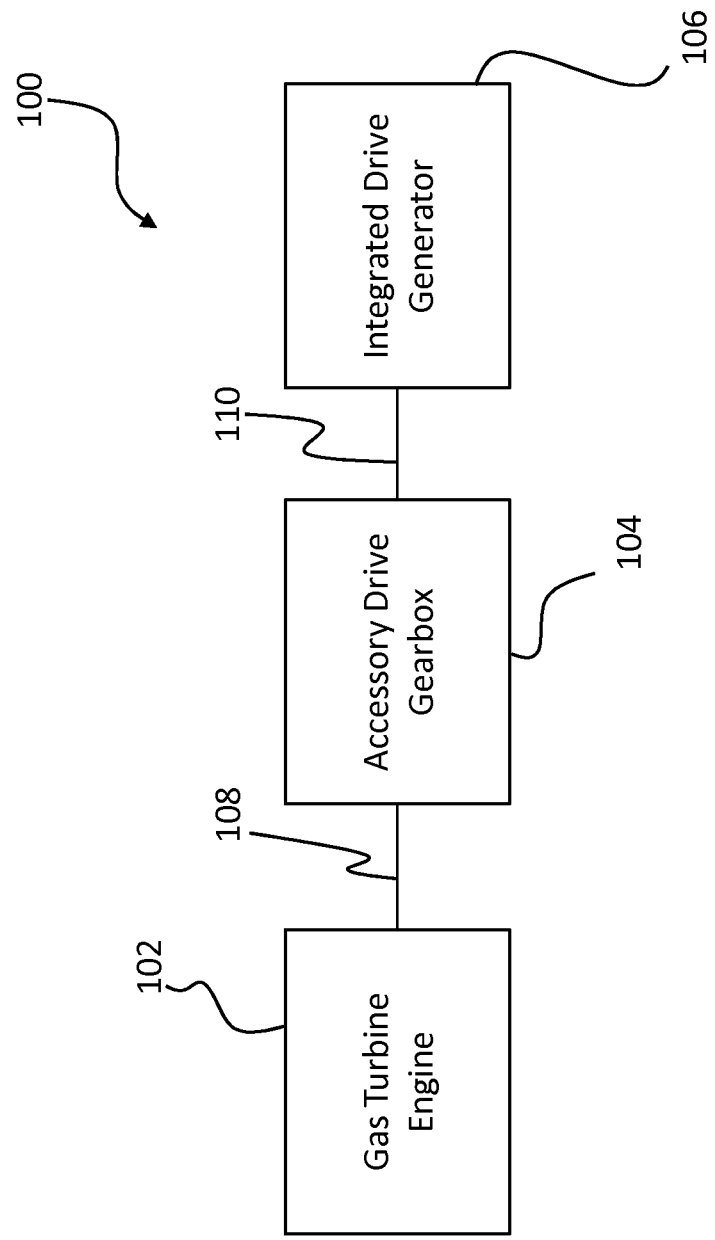
FIG. 1 is a schematic diagram of an exemplary power generator system of an aircraft.

Referring now to FIG. 1, an example of a generator system 100 is schematically illustrated. The generator system 100 includes a gas turbine engine 102 that is configured to rotationally drive an integrated drive generator 106 through an accessory drive gearbox 104 mounted on the gas turbine engine 102. The accessory drive gearbox 104 is coupled to a spool 108 of the gas turbine engine 102, and the speed of the spool 108 varies throughout the entire operation of the gas turbine engine 108, depending on operational characteristics, such as high altitude cruising flight or take-off of the aircraft. An input shaft 110 is configured to transfer rotational energy to the integrated drive generator 106 from the accessory drive gearbox 104. Those skilled in the art will appreciated that the generator system of FIG. 1 directed to an aircraft is merely presented for illustrative and explanatory purposes and other generators systems and/or engines may be used without departing from the scope of the invention.

Figure 2:
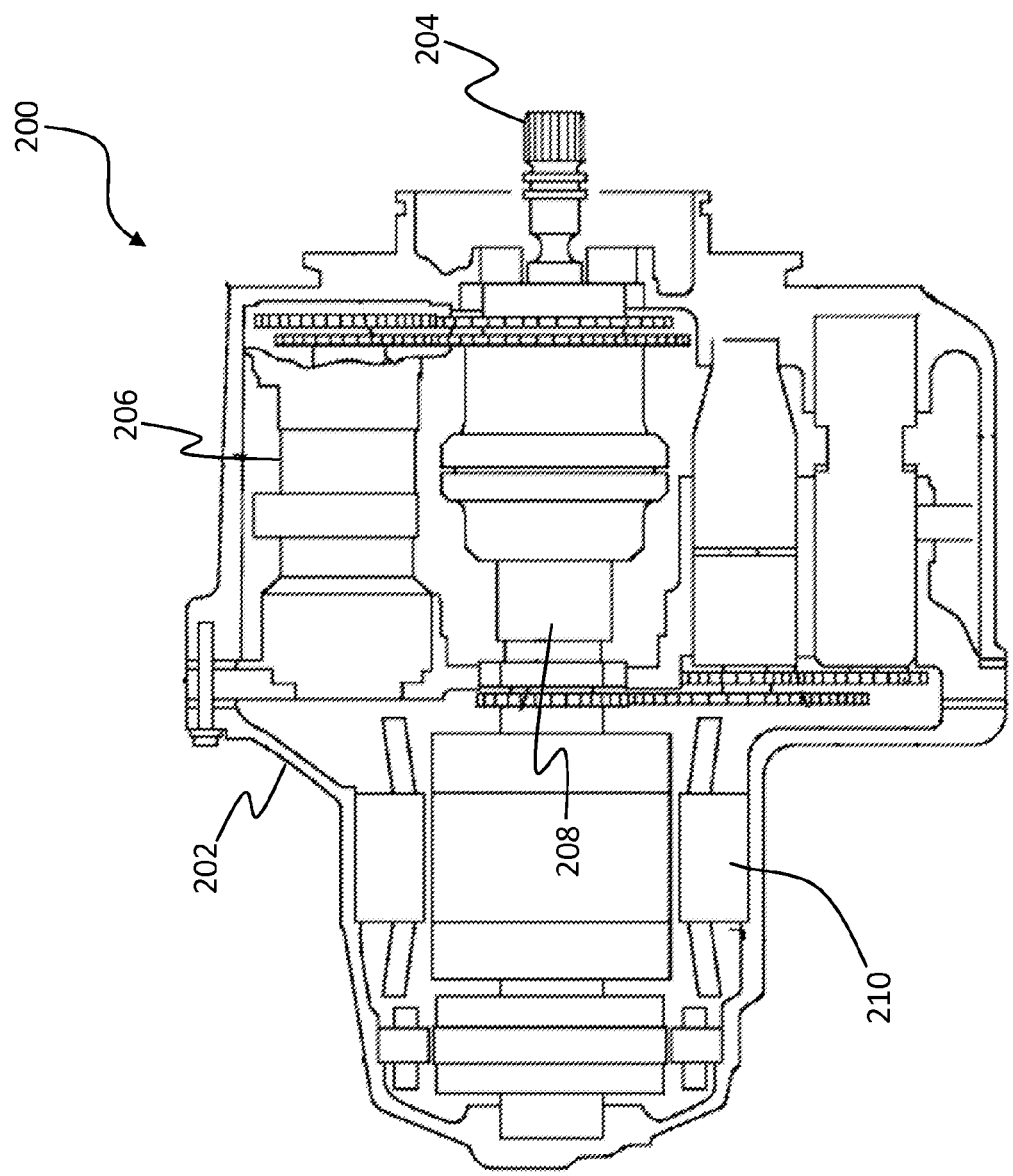
FIG. 2 is a cross-sectional schematic view of an example of an integrated drive generator.

An example of an integrated drive generator 200 including a housing 202 is shown in FIG. 2. In the illustrated embodiment, the integrated drive generator 200 includes an input shaft 204 configured to receive rotational drive from an accessory drive gearbox (see FIG. 1). The rotational speed of the input shaft 204 varies depending upon the operation of the engine (see FIG. 1). To this end, a hydraulic unit 206 cooperates with a differential assembly 208 to convert the variable rotational speed from the input shaft 204 to a fixed rotational output speed that is transferred to a generator 210.

Figure 3:
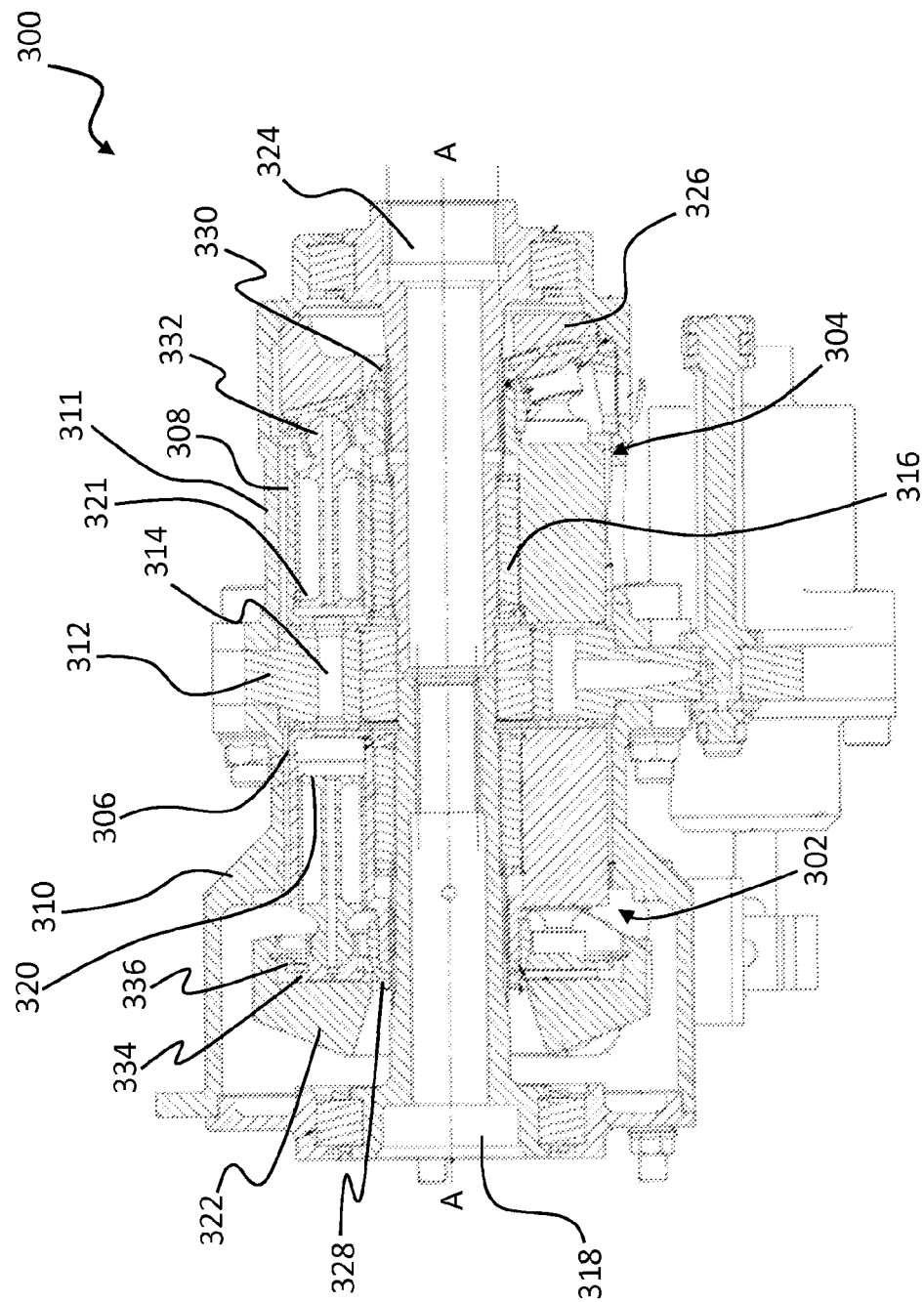
FIG. 3 is a cross-sectional schematic view of an example of a hydraulic unit of an integrated drive generator.

Referring now to FIG. 3, an exemplary embodiment of a hydraulic unit 300 of an integrated drive generator is shown. The hydraulic unit 300 includes a variable displacement hydraulic pump 302 and a fixed displacement hydraulic motor 304. The variable displacement hydraulic pump 302 and the fixed displacement hydraulic motor 304 have respective cylinder blocks 306 and 308 which are arranged for rotation about a common axis A within housings 310, 311 on opposite sides of a stationary port plate 312 of the hydraulic unit 300. The port plate 312 is formed with one or more kidneys or apertures 314 through which hydraulic fluid communication between the pump 302 and the motor 304 is established during normal operation of the hydraulic unit 300. A biasing mechanism 316 resiliently biases the cylinder blocks 306, 308 in the direction of the port plate 312.

The operation of the hydraulic unit 300 in an integrated drive generator, for example an integrated drive generator of an aircraft, involves transmission of torque from an engine of the aircraft to an input, which rotates an input shaft 318 of the hydraulic unit 300 about axis A. The cylinder block 306 of the pump 302 is connected to the input shaft 318 for rotation therewith. Pistons 320 within the cylinder block 306 of the pump 302 are displaced during rotation an amount which is a function of the setting of a variable swash plate or wobbler 322 of the pump 302. Similarly, pistons 321 within the cylinder block 308 of the motor 304 are displaced during rotation an amount which is a function of the setting of a variable swash plate or wobbler 322 of the pump 302. Those of skill in the art will appreciate that any number of pistons and associated apertures may be employed without departing from the scope of the invention. For example, in one exemplary embodiment, the system may include nine pistons in each of the motor and the pump, and nine apertures may pass through the port plate. Further, for example, the number of apertures is not dependent on the number of pistons, and in some embodiments there may be five apertures when nine pistons are employed. Thus, the number of pistons and the number apertures may be varied without departing from the scope of the invention.

Hydraulic fluid under pressure from the hydraulic pump 302 is delivered to the hydraulic motor 304 through the apertures 314 of port plate 312 for rotating the cylinder block 308 and an output shaft 324 to which the cylinder block 308 is fixedly connected. The swash plate or wobbler 326 of the motor 304 is fixedly configured so that an operating speed of the motor 304 is a function of a displacement of the pump 302. The rotary output from output shaft 324 is added to or subtracted from the rotary motion from the engine through a conventional differential gearing of an integrated drive generator for operating an electrical generator at a substantially constant rotational speed. That is, since the speed of the rotation from the aircraft engine to the input shaft 318 of the hydraulic unit 300 will vary, the position of the variable wobbler 322 is adjusted in response to these detected speed variations for providing the necessary reduction or increase in the rotational speed for obtaining a desired constant output speed to the generator. During normal operation, there is a hydrostatic balance of the cylinder blocks 306, 308 and port plate 312. Although the hydraulic unit 300 illustrated and described herein refers to the variable unit as a pump 302 and the fixed unit as a motor 304, hydraulic units having other configurations, such as where the variable unit functions as a motor and the hydraulic unit operates as a pump for example, are within the scope of the invention.

During operation, the wobbler 322 is permitted to turn, rotate, tumble, and/or wobble about a retainer ball 328. The wobbler 322 is configured to wobble, etc., in part, as a result of the movement of the pistons 320, 321, respectively. A retainer ball 330 is configured to turn or rotate with respect to the wobbler 326. Each piston 320, 321 has a ball 332 (ball of piston 320 not labeled for clarity) on one end. The ball 332 of the pistons 320, 321 is retained within a slipper 334. The slipper 334 is retained by a slipper retainer 336. The slipper retainer 336 enables the slipper 334 to be held in contact with the wobbler 322, 326, thus enabling operational coupling and/or contact between the wobblers 322, 326 and the pistons 320, 321, respectively, of the pump 302 and the motor 304.

Figure 4B:
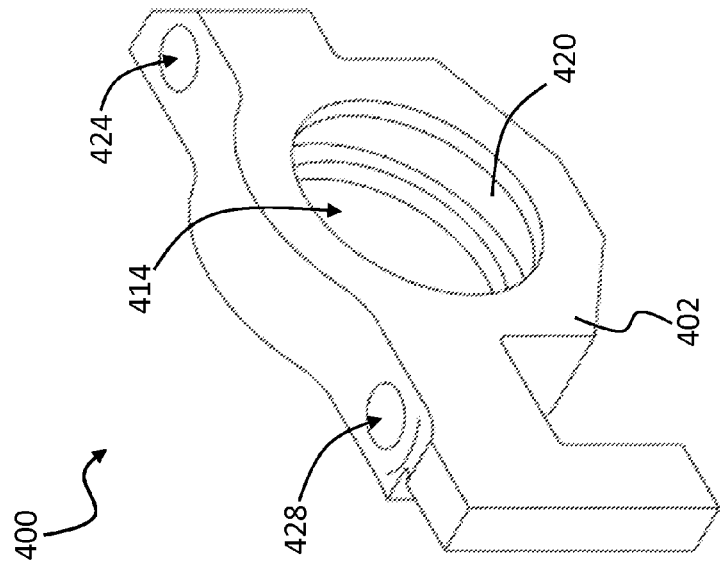
FIG. 4B is a bottom side isometric view of the roller bearing outer race of FIG. 4A.
Figure 4A:
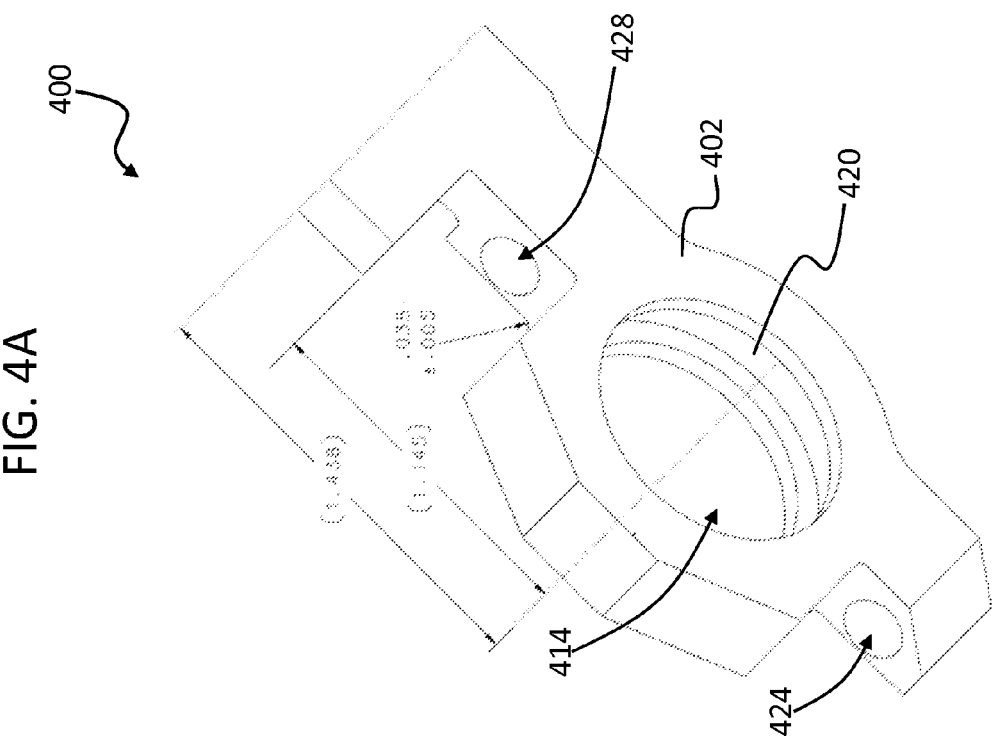
FIG. 4A is a top side isometric view of a roller bearing outer race in accordance with an exemplary embodiment of the invention.
Figure 4C:
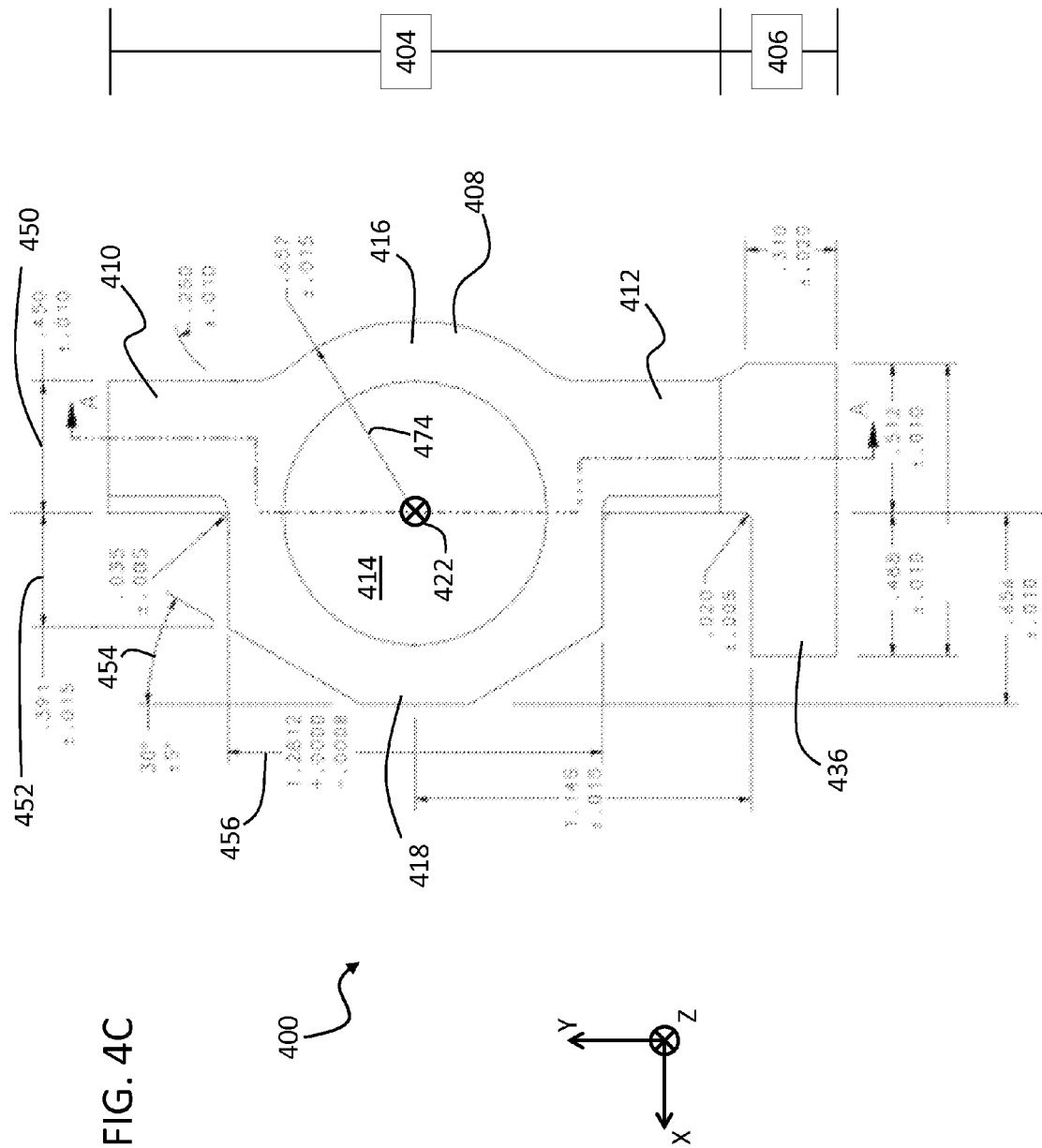
FIG. 4C is a is a side view of the roller bearing outer race of FIG. 4A.
Figure 4E:
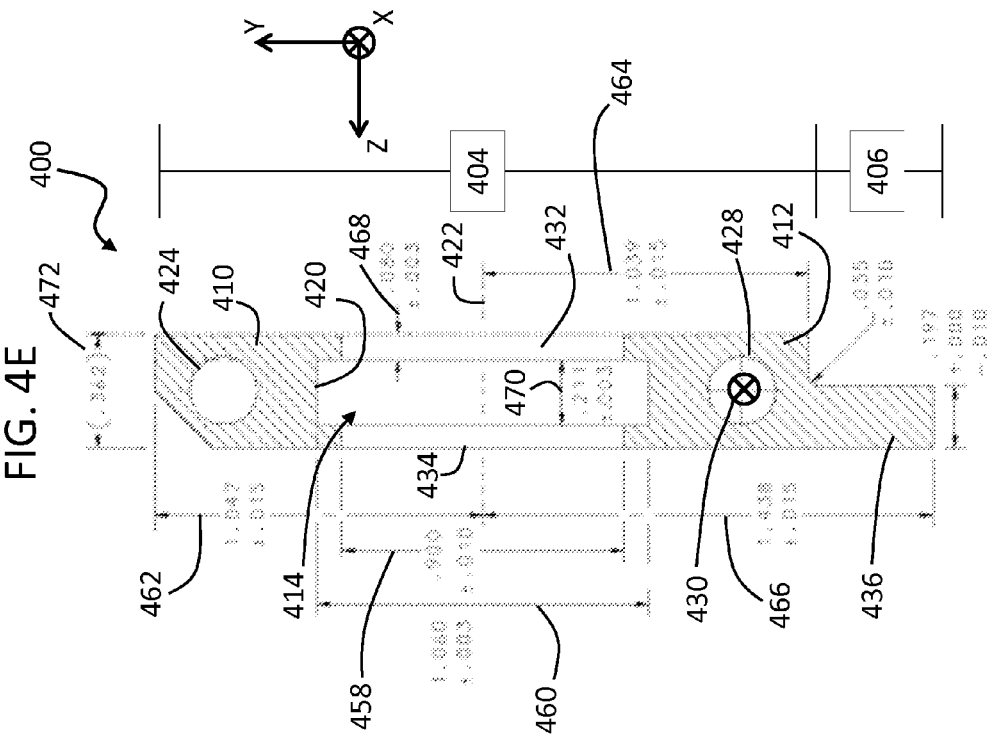
FIG. 4E is a cross-sectional view of the roller bearing outer race of FIGS. 4A-4D as viewed along the line A-A of FIG. 4C.
Figure 4D:
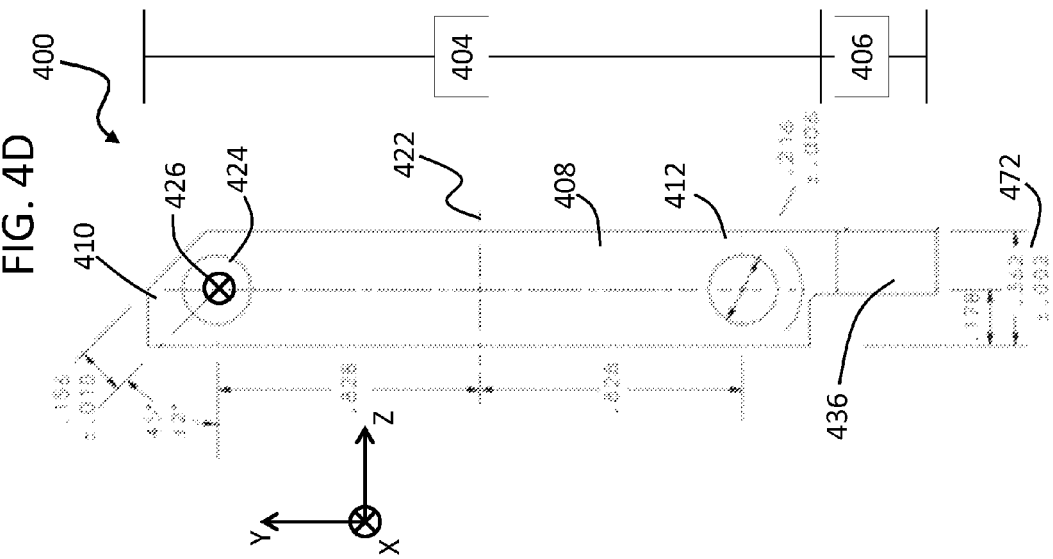
FIG. 4D is a bottom plan view of the roller bearing outer race of FIG. 4A.

Turning now to FIGS. 4A-4E, various views of an exemplary roller bearing outer race 400 in accordance with embodiments of the invention are shown. FIG. 4A is a top side isometric view of the roller bearing outer race 400; FIG. 4B is a bottom side isometric view of the roller bearing outer race 400; and FIG. 4C is a side view of the roller bearing outer race 400; FIG. 4D is a bottom plan view of the roller bearing outer race 400; and FIG. 4E is a cross-sectional view of the roller bearing outer race 400 as viewed along the line A-A of FIG. 4C. FIGS. 4C, 4D, and 4E show an X-Y-Z coordinate/directions reference for explanatory purposes.

As shown, roller bearing outer race 400 is formed of a body 402 having a first part 404 and a second part 406. The first part 404 includes a central section 408, a first arm 410, and a second arm 412. The first arm 410 and the second arm 412 extend from opposite or opposing sides of the central section 408. A bearing aperture 414 passes through the central section 408 of the first part 404, and defines a circular hole in the central section 408. The central section 408 includes a curved portion 416 and an angled portion 418 that define a bearing race 420 and the bearing aperture 414.

The curved portion 416 includes an exterior curved surface on an outside of the body 402 relative to the central aperture 414 and an interior curved surface that includes a portion of the bearing race 420 and defines part of a surface that defines the central aperture 414. The angled portion 418 includes an exterior angled surface on an outside of the body 402 relative to the central aperture 414 and an interior curved surface that includes a portion of the bearing race 420 and defines part of a surface that defines the central aperture 414. The central aperture 414, defined by the interior surfaces of the curved portion 416 and the angled portion 418 has an axis 422 passing therethrough. The axis 422 extends in the Z direction, as shown in FIGS. 4C-4E.

The first arm 410 includes a first securing aperture 424 extending therethrough, with an axis 426 that is perpendicular to the axis 422 that passes through the central aperture 414. The second arm 412 includes a second securing aperture 428 that is substantially similar to the first securing aperture 424 with an axis 430 parallel to the axis 426. The axes 426, 430 extend in the X direction, as shown in FIGS. 4C-4E. The first securing aperture 424 and the second securing aperture 428 are configured to securingly attach or connect the roller bearing outer race 400 to a hydraulic unit. The race 420 within the central section 408, and partly defining the central aperture 414, has a first race wall 432 and a second race wall 434, as shown in FIG. 4E.

Attached to the second arm 412, on a side opposite from the central section 408, is the second part 406. The second part 406 is formed as a bar 436 extending in the X direction.

A thickness 450 in the X direction of each of the first arm 410 and the second arm 412 is about 0.450 inches (1.143 cm) with a variability of about +/−0.010 inches (0.025 cm). the central section 408 extends from the first arm 410 a distance 452 of about 0.391 inches (0.993 cm) with a variability of about +/−0.015 (0.038 cm) in the X direction until the angled surface of the angled portion 408 begins. The angled surface of the angled portion 408 then extends relatively in Z direction at an angle 454 at about 30° with a variability of about +/−5°.

A width 456 of the central section 408 is about 1.2812 inches (3.2542 cm) with a variability of about +0.0000 inches (0.0000 cm) and about −0.0008 inches (0.0020 cm). The diameter 458 of the central aperture 414 is about 0.900 inches (2.286 cm) with a variability of about +/−0.010 inches (0.025 cm), which is also the diameter formed by the first and second race walls 432, 434. The race 420 has a diameter 460 of about 1.060 inches (2.692 cm) with a variability of about +/−0.003 inches (0.008 cm).

A distance 462 from the central axis 422 to an end of the first arm 410 is about 1.047 inches (2.659 cm) with a variability of about +/−0.015 inches (0.038 cm). A distance 464 from the central axis 422 to an end of the second arm 412 (where it joins the second part 406) is about 1.039 inches (2.639 cm) with a variability of about +/−0.015 inches (0.038 cm). A distance 466 from the central axis 422 to an end of the second part 406, and the bar 436 thereof, is about 1.438 inches (3.653 cm) with a variability of about +/−0.015 inches (0.038 cm).

The thickness 468 of the second race wall 432, in the Z direction, is about 0.080 inches (0.203 cm) with a variability of about +/−0.003 inches (0.008 cm). The thickness 470 of the race 420, in the Z direction, is about 0.211 inches (0.536 cm) with a variability of about +/−0.003 inches (0.008 cm). A thickness 472 of the roller bearing out race 400 in a Z direction is about 0.362 inches (0.919 cm) with a variability of about 0.002 inches (0.005 cm).

The curved surface of the curved portion 416 of the central section 408 of first part 404 is a distance 474 of about 0.657 inches (1.669 cm) with a variability of about +/−0.015 inches (0.038 cm) radially from the axis 422.

FIGS. 4A-4E display certain dimensions not discussed above, but are pertinent and relate to various embodiments and/or alternatives of the invention disclosed herein. Thus, the dimensions detailed on the figures, but not discussed above, are incorporated into this specification.

Advantageously, roller bearing outer races configured in accordance with embodiments of the invention appropriately fit within and operate with specific hydraulic units. Further, advantageously, failure and damage is less likely to occur and efficiency is increased within specific hydraulic units when roller bearing outer races in accordance with embodiments of the invention are employed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments.

Accordingly, the invention is not to be seen as limited by the foregoing description, but is only limited by the scope of the appended claims.

What is claimed is:

1. A roller bearing outer race of a hydraulic unit, comprising:
   a body having a first part and a second part, the first part comprising:
   a central section having an exterior curved portion, an exterior angled portion, and a circular inner portion and a central aperture defining a first axis passes through the circular inner portion of the central section;
   a first arm extending from a first side of the central section; and
   a second arm extending from a second side of the central section; and
   a race within the circular inner portion of the central section, the race defined by a first race wall and a second race wall;
   wherein a thickness of the first arm and the second arm is about 0.450 inches (1.143 cm) and a radial distance of an exterior surface of the exterior curved portion from the first axis is about 0.657 inches (1.669 cm); and
   wherein the second part is attached to the second arm on a side of the second arm opposite the central section and defines a bar extending in a direction perpendicular to the first axis.

2. The roller bearing outer race of claim 1, wherein the variability of the thickness of the first arm and the second arm is +/−0.010 inches (0.025 cm).

3. The roller bearing outer race of claim 1, wherein the variability of the radial distance of the exterior surface is +/−0.015 inches (0.038 cm).

4. The roller bearing outer race of claim 1, wherein the race has an axial thickness, in the direction of the first axis, of about 0.211 inches (0.536 cm) with a variability of about +/−0.003 inches (0.008 cm).

5. The roller bearing outer race of claim 1, wherein the first race wall has an axial thickness, in the direction of the first axis, of about 0.080 inches (0.203 cm) with a variability of about +/−0.003 inches (0.008 cm).

6. The roller bearing outer race of claim 1, wherein the diameter of the race is about 1.060 inches (2.692 cm) with a variability of about 0.003 inches (0.008 cm).

7. The roller bearing outer race of claim 1, wherein at least one of the first arm and the second arm have an aperture extending therethrough with a second axis that is perpendicular to the first axis.

8. The roller bearing outer race of claim 1, wherein the bar has a thickness in the axial direction of the first axis that is thinner than the thickness of the body.

9. The roller bearing outer race of claim 1, wherein the bar extends a distance of about 1.438 inches (3.653 cm) with a variability of about +/−0.015 inches (0.038 cm).

10. The roller bearing outer race of claim 1, wherein the first arm extends a distance of about 1.047 inches (2.659 cm) with a variability of about +/−0.015 inches (0.038 cm) from the first axis.

11. The roller bearing outer race of claim 1, wherein the second arm extends a distance of about 1.039 inches (2.639 cm) with a variability of about +/−0.015 inches (0.038 cm).

* * * * *